US00RE48639E

(19) United States
(12) Reissued Patent
Wayne et al.

(10) Patent Number: US RE48,639 E
(45) Date of Reissued Patent: Jul. 13, 2021

(54) COMPOSITE HEAT SPREADER AND BATTERY MODULE INCORPORATING THE SAME

(71) Applicant: NEOGRAF SOLUTIONS, LLC, Lakewood, OH (US)

(72) Inventors: Ryan J. Wayne, Brecksville, OH (US); Jonathan Andrew Taylor, Mayfield, OH (US)

(73) Assignee: NEOGRAF SOLUTIONS, LLC, Lakewood, OH (US)

(21) Appl. No.: 16/396,133

(22) Filed: Apr. 26, 2019

Related U.S. Patent Documents

Reissue of:
(64) Patent No.: 9,797,664
Issued: Oct. 24, 2017
Appl. No.: 13/766,807
Filed: Feb. 14, 2013

U.S. Applications:
(60) Provisional application No. 61/600,806, filed on Feb. 20, 2012.

(51) Int. Cl.

| | |
|---|---|
| ***H01M 2/10*** | (2006.01) |
| ***F28F 21/02*** | (2006.01) |
| ***H01M 10/647*** | (2014.01) |
| ***H01M 2/34*** | (2006.01) |
| ***H01M 10/6551*** | (2014.01) |
| ***H01M 10/6555*** | (2014.01) |

(Continued)

(52) U.S. Cl.
CPC ..... *F28F 21/02* (2013.01); *H01M 10/647* (2015.04); *H01M 10/6551* (2015.04); *H01M 10/6555* (2015.04); *H01M 50/209* (2021.01); *H01M 50/581* (2021.01)

(58) Field of Classification Search
CPC ..... F28F 21/02; H01M 2/1061; H01M 2/348; H01M 10/647; H01M 10/6551; H01M 10/6555; Y02E 60/10
See application file for complete search history.

(56) References Cited

U.S. PATENT DOCUMENTS 3,404,061 A * 10/1968 Bochman et al. ..... D01F 9/12 428/143
5,198,063 A * 3/1993 Howard ..... B32B 27/06 156/282
2005/0003200 A1* 1/2005 Norley et al. ..... 428/413
(Continued)

FOREIGN PATENT DOCUMENTS

WO WO-2010/058587 A1 * 5/2010 ..... H01M 2/10

OTHER PUBLICATIONS

"Phenolic Resins Technology Handbook", NPCS Board of Consultants and Engineer, Oct. 1, 2007, p. 186-189.*
(Continued)

*Primary Examiner* — Ling X Xu
(74) *Attorney, Agent, or Firm* — Calfee, Halter & Griswold LLP

(57) ABSTRACT

A composite heat spreader includes a first flexible graphite layer, a second flexible graphite layer, and a gas evolving layer positioned between the first flexible graphite layer and the second flexible graphite layer. The gas evolving layer is temperature sensitive and when a threshold temperature is reached, the thermal conductivity of the gas evolving layer is reduced by at least factor of five.

28 Claims, 5 Drawing Sheets

(51) Int. Cl.
*H01M 50/209* (2021.01)
*H01M 50/581* (2021.01)

(56) References Cited

U.S. PATENT DOCUMENTS

2005/0079304 A1* 4/2005 Clovesko et al. ..... 428/34.5
2005/0079407 A1* 4/2005 Higashino et al. ..... 429/66
2005/0142317 A1* 6/2005 Clovesko ..... H05K 7/20963 428/40.1
2006/0098413 A1* 5/2006 Capp ..... B32B 5/16 361/705
2006/0177643 A1* 8/2006 Kondo ..... B01D 67/0018 428/304.4
2007/0103875 A1* 5/2007 Reis et al. ..... 361/719
2009/0223555 A1* 9/2009 Ammar ..... H02S 40/425 136/246
2009/0280400 A1* 11/2009 Tsukamoto ..... C09K 21/06 429/120
2010/0173194 A1* 7/2010 Fujiya ..... H01M 2/0212 429/178
2011/0177366 A1* 7/2011 Nagasaki et al. ..... 429/83
2013/0115506 A1* 5/2013 Wayne ..... H01M 10/6555 429/120

OTHER PUBLICATIONS

"Polyethylene" data sheet, WS Hampshire Inc., retrieved on Jan. 21, 2016 from http://www.wshampshire.com/pdf/psg_uhmw_polyethylene.pdf.*
"Polypropylene Properties", Vinidex, retrieved on Jan. 21, 2016 from http://www.vinidex.com.au/technical/material-properties/polypropylene-properties/.*

* cited by examiner

COMPOSITE HEAT SPREADER AND BATTERY MODULE INCORPORATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. Provisional Application 61/600,806 filed Feb. 20, 2012, entitled Composite Heat Spreader and Battery Module Incorporating the Same, which is hereby incorporated herein in its entirety by reference.

BACKGROUND

Thermal runaway is a phenomenon in which a fire or high heat event in a lithium ion battery cell propagates to adjacent lithium ion batteries, resulting in a chain reaction that can risk the safety of the user and/or destruction of property. The thermal runaway event can be caused by, for example, overcharging a cell, mechanical damage to the cell or exposure of the cell to high temperatures. To meet power and energy density targets for electric vehicle applications, lithium ion cells must be packaged in a way that minimizes unused space. Unfortunately, this tight spacing increases heat transfer between cells and can therefore exacerbate thermal runaway risk in the event that one cell within the pack becomes compromised.

Accordingly, there is a need in the art for improved mechanisms to minimize the effects of thermal runaway in a form-factor that is compatible to high energy density battery modules.

SUMMARY

According to one aspect, a composite heat spreader includes a first flexible graphite layer, a second flexible graphite layer, and a gas evolving layer positioned between the first flexible graphite layer and the second flexible graphite layer. When a threshold temperature is reached, the thermal conductivity of the gas evolving layer is reduced by at least factor of five.

According to another aspect, a battery pack includes a plurality of battery cells arranged in a stacked configuration. The battery cells each include an opposed major surface. At least one composite heat spreader is positioned between two adjacent battery cells and contact a major surface of each adjacent battery cell. The composite heat spreader includes a first flexible graphite layer, a second flexible graphite layer, and a gas evolving layer positioned between the first flexible graphite layer and the second flexible graphite layer. When a threshold temperature is reached, the thermal conductivity of the gas evolving layer is reduced by at least a factor of five.

DETAILED DESCRIPTION OF THE EMBODIMENTS

Figure 1:
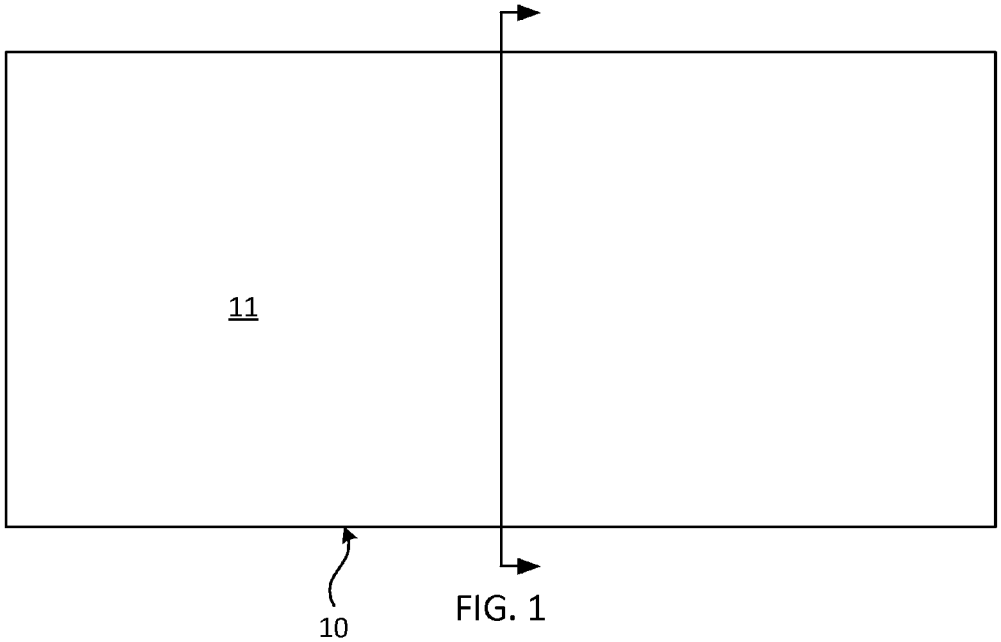
FIG. 1 is a top view of a composite heat spreader.
Figure 2:
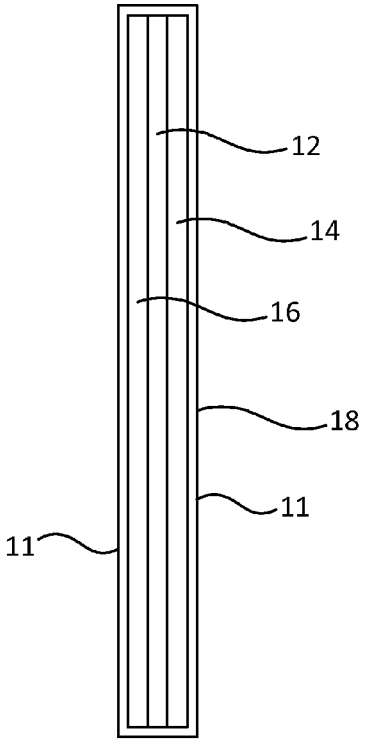
FIG. 2 is a sectional view taken along line A-A of FIG. 1 of the composite heat spreader.

With reference now to FIGS. 1 and 2, a composite heat spreader is shown and generally indicated by the numeral 10. Composite heat spreader 10 may advantageously be generally, planar, rectangular and thin relative to the overall length and width. This rectangular configuration is advantageous when used in conjunction with rectangular prismatic lithium ion batteries as they have a similar form factor. In one embodiment, the composite heat spreader 10 is generally sheet-like and includes two opposed major surfaces 11. As will be described in greater detail below, major surfaces 11 of composite heat spreader 10 engage the major surfaces of battery cells to spread heat as well as transfer heat away from the battery cell. In one embodiment, the major surface includes an area from between about 25 $mm^2$ to about 1 $m^2$. In other embodiments the surface area of a major surface is from between about 4 $cm^2$ to about 900 $cm^2$. In these or other embodiments, the composite heat spreader 10 may have a thickness from between about 0.025 mm to about 5 mm. In other embodiment, the thickness may be from about 0.25 mm to about 2 mm. In still further embodiments, the thickness may be from about 0.5 mm to about 1 mm. It should be appreciated, however, that even though the exemplary embodiment of FIG. 1 is rectangular in shape, other configurations are envisioned. For example, the composite heat spreader 10 could be square, circular or any other configuration depending on the form factor of the corresponding battery cell with which it is adapted to contact.

Composite heat spreader 10 includes a central gas evolving layer 12 positioned between a first flexible graphite layer 14 and a second flexible graphite layer 16. Optionally, the gas evolving layer 12 and flexible graphite layers 14 and 16 are encapsulated by a containment shell 18. Gas evolving layer 12 may advantageously have a thickness from between about 0.005 mm to about 5 mm, more advantageously from between about 0.025 mm to about 1 mm, and still more advantageously from between about 0.125 mm and about 0.5 mm. Flexible graphite layer(s) 14 and 16 may each advantageously have a thickness from between about 0.01 mm to about 2 mm, more advantageously from between about 0.125 mm to about 1 mm, and still more advantageously from between about 0.25 mm and about 0.5 mm. Containment shell 18 may advantageously have a thickness from between about 0.001 mm to about 1 mm, more advantageously from between about 0.002 mm to about 0.1 mm, and still more advantageously from between about 0.005 mm and about 0.02 mm.

As used herein, the term gas evolving references any substance, solid, semisolid or liquid that undergoes a chemical change (thermal decomposition to simpler gas molecules) or phase change (ex. sublimation or boiling) that is initiated when a threshold temperature is reached. The gas evolving layer may be a homogeneous composition, a heterogeneous mixture, or a layered structure. In one embodiment, the gas evolving layer is a hydrocarbon polymer. In order to improve low temperature gas evolving properties (i.e. below 150 C), in one embodiment, gas evolving layer may include mixtures of components that undergo a condensation reaction when heat is added. In the condensation reaction, the mixture of reactants may combine to give off water (which has a boiling point of 100 C) or acetic acid (which has a boiling point of 119 C). Another embodiment, the gas evolving layer may include a hydrated structure or matrix (organic or inorganic) that dehydrates (i.e. gives off water) when heated. In these or other embodiments, at higher temperatures, (i.e. above 150 C) the gas evolving layer may include a polymer in the form of a pressure sensitive adhesive, such as, for example, acrylic adhesives, which will give off water that becomes gas.

Advantageously, the material of the gas evolving layer 12 functions as an adhesive to hold together the flexible graphite layers 14 and 16 at temperatures below about 100 degrees C. In other embodiments the gas evolving layer 12 functions as an adhesive at temperatures below about 125 degrees C. In still other embodiments, the gas evolving layer 12 functions as an adhesive at temperatures below about 150 degrees C. In one embodiment, the gas evolving threshold temperature is at or above about 95 degrees C. In still other embodiments, the gas evolving threshold temperature is at or above about 125 degrees C. In still further embodiments, the gas evolving threshold temperature is at or above about 150 degrees C. As discussed above, once the threshold temperature is reached, the gas evolving layer begins to evolve a gas through phase change, thermal decomposition, or a combination thereof. Advantageously, the evolved gas is nontoxic and nonflammable. Even more advantageously, oxygen and/or hydrogen is consumed during the gas evolving process to create $CO_2$ and/or $H_2O$.

Figure 3:
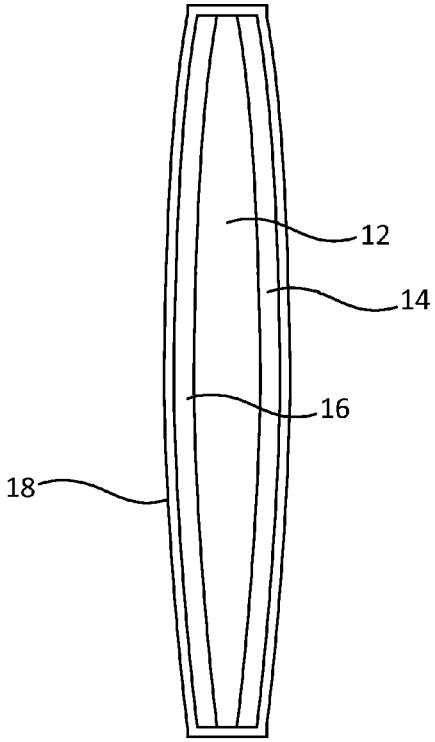
FIG. 3 is a sectional view taken along line A-A of FIG. 1 after the composite heat spreader has reached a gas evolving threshold temperature.

With reference now to FIG. 3, as can be seen, the increased pressure resulting from the evolved gas causes expansion of the gas evolving layer 12. This expansion in turn pushes first flexible graphite layer 14 away from second flexible graphite layer 16. Put another way, after the threshold temperature is reached, the composite heat spreader begins to delaminate and expand in the thru-plane direction. In one embodiment, the gas evolving layer average thickness (defined as the average distance between the first flexible graphite layer 14 and the second flexible graphite layer 16) increases by advantageously at least about 10%, more advantageously at least about 50%, yet more advantageously at least about 100% and still more advantageously at least about 200%.

By increasing the gas evolving layer average thickness (as well as reducing density of the gas evolving layer) after exceeding a thermal threshold, the composite heat spreader may function as a thermal fuse. By thermal fuse it is meant that the thru-thickness thermal conductivity of the composite heat spreader is decreased to effectively shield adjacent battery cells from the heat generated by the overheating cell. In one embodiment, after exceeding the thermal threshold the thru-thickness thermal conductivity of the composite heat spreader decreases by from between about a factor of about 10 to about 100. In other embodiments, the thruthickness conductivity is reduced by at least a factor of 5, more advantageously at least a factor of 10, yet more advantageously by at least a factor 50 and still more advantageously at least a factor of 100. In these or other embodiments, the thru-thickness thermal conductivity of the gas evolving layer after exceeding the thermal threshold is less than about. 5 W/mK, more advantageously less than about 0.1 W/mK, yet more advantageously less than about 0.05 W/mK and still more advantageously less than about 0.01 W/mK.

In one embodiment, the gas evolving layer 12 may include, in addition to a primary gas evolving substance, an additive that increases the volume of evolved gas and/or absorbs thermal energy in the event of a thermal runaway. One example of such an additive is water, which, when liberated as a gas may tend to cause blistering on the surfaces of the flexible graphite layers 14 and 16 which face the gas evolving layer 12. This blistering would tend to increase the thru-plan thermal resistance of the flexible graphite layers. It should be appreciated that other additives may employed, for example, intumescent compounds such as expandable graphite or phase change materials such as wax. These or other additives may optionally be microencapsulated so that they do not interfere with the adhesive function of the inner layer.

First and second flexible graphite layer 14 and 16 may each be thin and sheet-like, having two opposed major surfaces. In one embodiment, the flexible graphite layers 14 and 16 may each be less than about 2 mm thick. In other embodiments the flexible graphite layers 14 and 16 may each be less than about 1 mm thick. In still other embodiments, the flexible graphite layers 14 and 16 may each be less than about 0.5 mm thick. According to one or more embodiments, flexible graphite layers 14 and 16 may be a sheet of a compressed mass of exfoliated graphite particles, a sheet of graphitized polyimide or combinations thereof.

Each flexible graphite layer functions to spread and/or conduct heat generated by the battery cell. Thus, each flexible graphite layer may have an in-plane thermal conductivity of greater than about 250 W/mK at about room temperature (using the Angstrom method to test at room temperature being approximately 25° C.). In another embodiment the in-plane thermal conductivity of each flexible graphite layer is at least about 400 W/mK. In yet a further embodiment, the in-plane thermal conductivity of flexible graphite layers may be at least about 550 W/mK. In additional embodiments, the in-plane thermal conductivity may range from at least 250 W/mK to about 1500 W/mK. In still further embodiments, the in-plane thermal conductivity may range from about 250 W/mK to about 700 W/mK. In another embodiment, the thru-plane thermal conductivity of each flexible graphite layer may be from between about 1 W/mK and about 20 W/mK. In this or other embodiments, the thru-plane thermal conductivity is from between about 2 W/mK and about 6 W/mK. In other embodiments, the thru-plane thermal conductivity is from between about 14 W/mK and about 18 W/mK. It is further preferred that the flexible graphite layers have an in-plane thermal conductivity of at least about twice the thermal conductivity of aluminum. Furthermore, each flexible graphite layer 14 and 16 may have the same or different in-plane thermal conductivities. Any combination of the above in-plane thermal conductivities may be practiced. Suitable graphite sheets and sheet making processes are disclosed in, for example, U.S. Pat. Nos. 5,091,025 and 3,404,061, the contents of which are incorporated herein by reference.

In an optional embodiment, one or more flexible graphite layers may be resin reinforced. The resin may be used, for example, to improve the rigidity of the flexible graphite layers and/or the impermeability of flexible graphite layers. In combination with resin reinforcement, or in the alternative, one or more flexible graphite layers may include carbon and/or graphite fiber reinforcement.

The flexible graphite is a more conformable material than conventional materials used in a battery pack for heat spreading (ex. aluminum). Use of flexible graphite offers a reduction in interfacial thermal heat transfer resistance between flexible graphite and an adjacent battery cell as compared to a battery cell and a conventional material (e.g. aluminum) for the transfer of heat. Because flexible graphite layers are more conformable, interfacial thermal heat transfer between battery cells having non-flat major surfaces (i.e. prismatic lithium ion batteries) is better than conventional materials. The conformability and the resulting reduction in interfacial thermal heat transfer resistance can reduce or even eliminate the need to apply a thermally conductive grease or paste to the surface of the composite heat spreader 10, as may be practiced to overcome the interfacial resistance of conventional materials.

As discussed above, the composite heat spreader 10 may optionally include a containment shell 18. Containment shell 18 may advantageously be made of a material with a melting temperature greater than about 150 degrees C., more advantageously greater than about 200 degrees C. and still more advantageously greater than about 250 degrees C. The containment shell 18 is advantageously of a molecular composition that, when heated, creates a non-conductive carbonaceous char instead of igniting. In one particularly preferred embodiment, the containment shell 18 is made of a plastic material. Examples of suitable plastic materials may include PET films, or polyimides such as Kapton® sold by DuPont Company.

Containment shell 18 may function to retain any evolved gasses from the gas evolving layer 12. If temperatures climb high enough to cause the containment shell 18 to rupture (due either to melting, charring or internal pressures) the evolved gasses, which advantageously are principally $CO_2$ and/or $H_2O$, may be released within the battery pack enclosure. As is known in the art, the release of $CO_2$ and/or $H_2O$ may tend to function as a countermeasure to fire and/or overheating in the battery pack enclosure.

According to one embodiment, the composite heat spreader 10 may be assembled by calendaring or pressing the gas evolving and flexible graphite layers. In such an embodiment, adhesives may optionally be employed between the flexible graphite and gas evolving layers to promote adhesion. In this or other embodiments, the adhesive may be applied proximate to the edges to promote formation of a pocket of gas that is retained at least temporarily after threshold temperature is reached. In other embodiments, the gas evolving and flexible graphite layers are held together due to the adhesive nature of the gas evolving layer. The containment shell may be calendared or pressed at the same time as the gas evolving and flexible graphite layers. In another embodiment, the containment shell may be applied after the composite heat spreader is cut into form. In such an instance the containment shell may be laminated or vacuum sealed around the part, which would in turn provide additional force to hold the various layers together during normal operating conditions.

Figure 4:
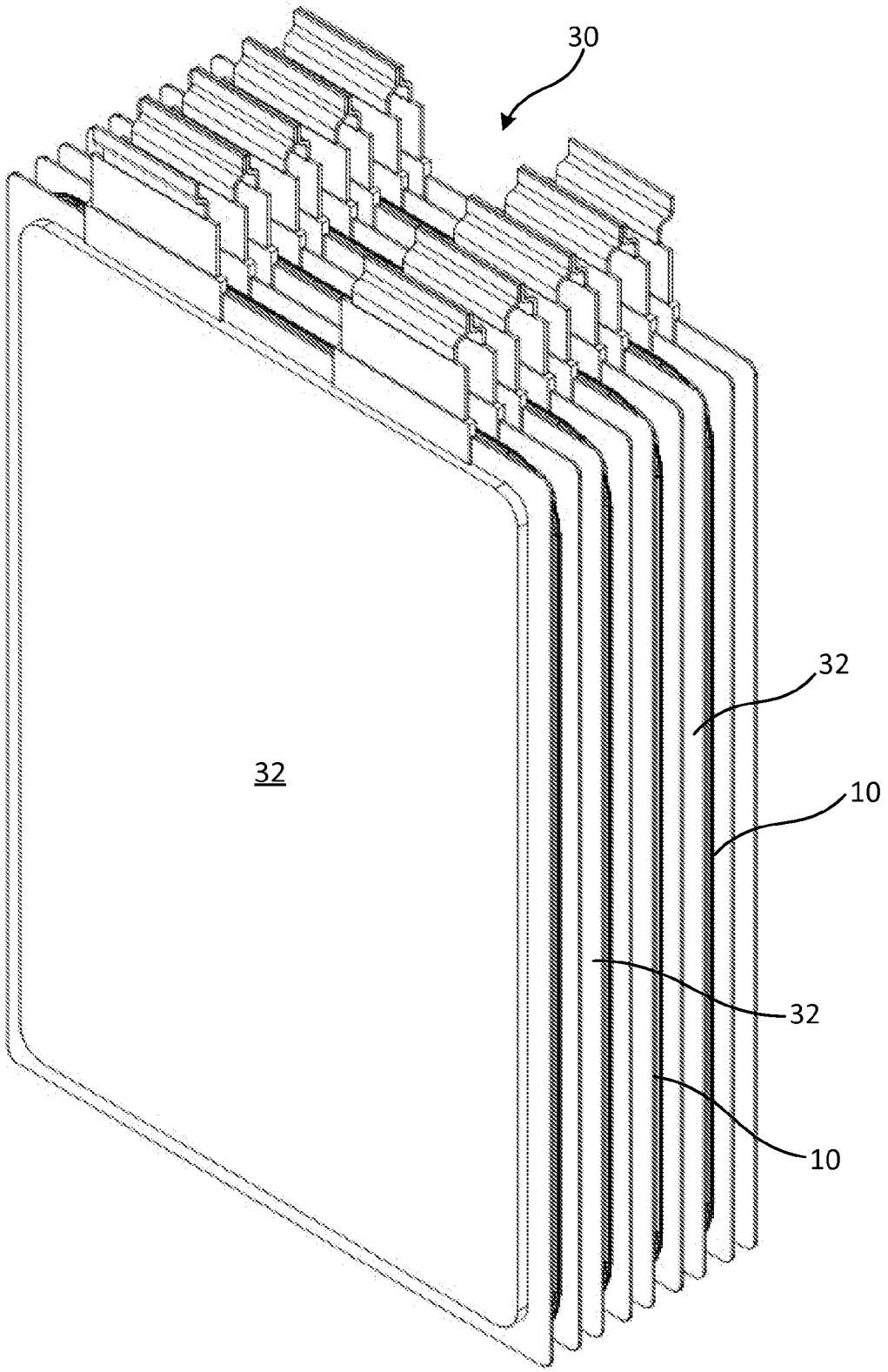
FIG. 4 is an isometric view of a battery pack incorporating the composite heat spreader.
Figure 5:
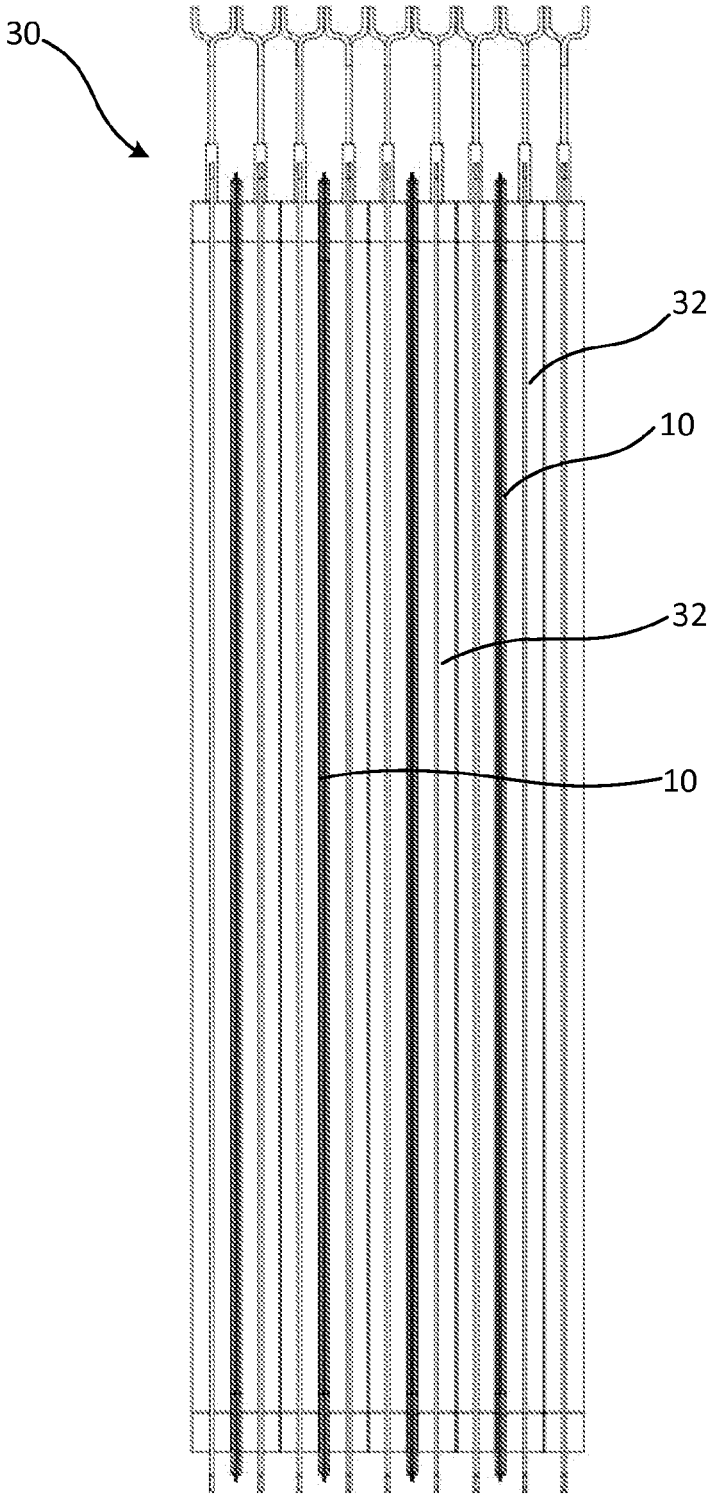
FIG. 5 is a side view of the battery pack of FIG. 4.

With reference now to FIGS. 4-5, a multi-cell battery pack is shown and generally indicated by the numeral 30. Battery pack 30 includes a plurality of prismatic lithium-ion cells 32 positioned in a stacked arrangement. As is known in the art, the battery stack would then be contained in an enclosure (not shown) to both maintain the physical arrangement of the cells 32 as well as to protect the battery pack from external causes of damage including heat, vibration, shock and the like. In one embodiment, the prismatic lithium-ion cell is generally rectangular or square shaped and has a thickness of from about 1 mm to about 10 mm. More preferably, the cell has a thickness of from about 3 mm to about 6 mm. In one embodiment of the battery pack, the prismatic lithium-ion cell has opposed major surfaces, each major surface footprint being at least 8 square inches, more preferably a footprint of at least 16. In one embodiment, the footprint is from about 49 square inches to about 400 square inches. In another embodiment, the footprint is from about 16 square inches to about 2500 square inches and the most preferably a footprint is from about 400 square inches to about 1600 square inches.

The case of each battery cell may be made of a hardened metal and/or plastic casing. Alternately, the case may be aluminum foil-laminated plastic film. The battery cell case is preferably made with aluminum foil-laminated plastic film, which has a thickness of from about 20 μm to about 200 μm. More preferably, the aluminum foil-laminated plastic film has a thickness of from about 30 μm to about 100 μm. Most preferably, aluminum foil-laminated plastic film has a thickness of from about 40 μm to about 50 μm. The positive electrode may be a lithium-ion positive electrode, the negative electrode may be a lithium-ion negative electrode and the electrolyte may be a lithium-ion electrolyte. Further, the electrolyte may be a liquid lithium-ion electrolyte or a polymer lithium-ion electrolyte.

Preferably, the lithium-ion cell has a specific energy density of greater than 200 wh/kg, more preferably greater than 210 wh/kg and the most preferably about 220 wh/kg or greater. In yet another embodiment, the large format lithiumion cell has an energy density of at least 450 wh/L, preferably at least 500 wh/L, more preferably at least 510 wh/L and most preferably at least 520 wh/L. In still another embodiment, the large format lithium-ion battery pack has an energy storage capacity of at least 0.25 kWh, more preferably at least 16 kWh, more preferably at least 24 kWh, more preferably at least 53 kWh and most preferably at least 100 kWh.

Large format prismatic cells are advantageously assembled into battery packs a stacked configuration, wherein the major surfaces of each cell 32 are facing the major surfaces of adjacent cells 32. This stacked arrangement maximizes the energy density, but is not conducive to transferring the heat away from the cells. This is particularly true of the interior cells of the battery pack located relatively far from one of the exterior surfaces of the battery pack 30. To facilitate heat transfer, composite heat spreaders 10 can be inserted in the spaces between the stacked prismatic cells. The composite heat spreaders 10 improve performance and life of the cells by reducing thermal gradients in the plane of the sheet and transporting heat directly to the surroundings of the pack or to a heat sink.

Composite heat spreaders 10 are interposed between at least one pair of adjacent cells 32 in the stack such that the opposed major surfaces 22 of the composite heat spreader 10 engages the major surfaces of adjacent cells 32. The composite heat spreaders 10 are advantageously interposed between every third cell 32, more advantageously between every two cells 32 and still more advantageously between each cell 32 in the stack. The composite heat spreaders 10 function principally to spread heat generated in the cells 32. Further, the composite heat spreaders 10 may function to conduct heat to one or more heat sinks (not shown).

Figure 6:
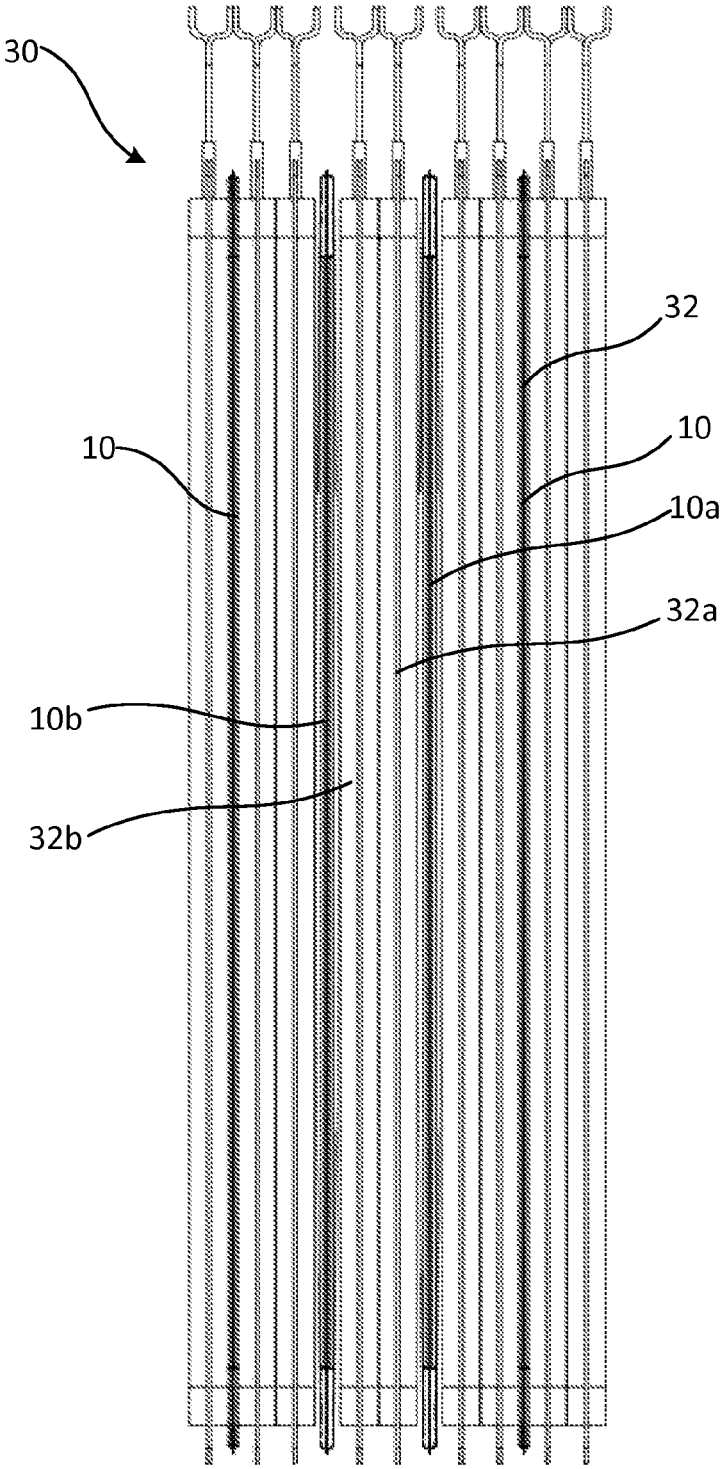
FIG. 6 is a side view of the battery pack of FIG. 4 wherein one or more battery cells experience a thermal runaway event.

With reference now to FIG. 6, an exemplary embodiment is disclosed wherein composite heat spreaders 10 are positioned between every other cell 32 (i.e. after every two cells in the stack). FIG. 6 is representative of the composite heat spreader 10 functionality if a thermal runaway event (i.e. an event wherein the gas evolving layer of one or more composite heat spreaders 10 was heated to a temperature greater than the gas evolving threshold temperature). If one or both of cells 32a and 32b experienced a failure causing thermal runaway, this heats the adjacent composite heat spreaders 10a and 10b. If the gas evolving layer 12 of heat spreaders l0a and 10b are heated above the gas evolving threshold temperature this will cause the composite heat spreaders l0a and 10b to expand as shown in FIG. 6. As discussed above, this expansion effectively reduces thru-plane thermal conduction and thus minimizes heat transfer to adjacent battery cells. In this manner, the adjacent cells are protected and the cells experiencing thermal runaway are contained.

Figure 7:
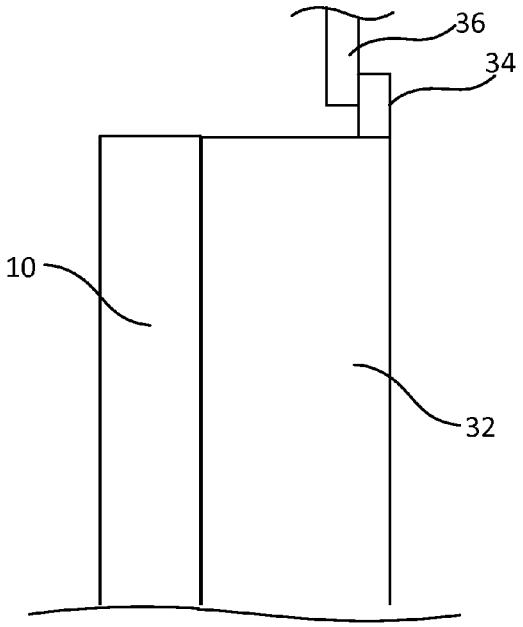
FIG. 7 is and enlarged side view of a battery cell adjacent a composite heat spreader, the battery cell being electrically connected to an electrical lead.
Figure 8:
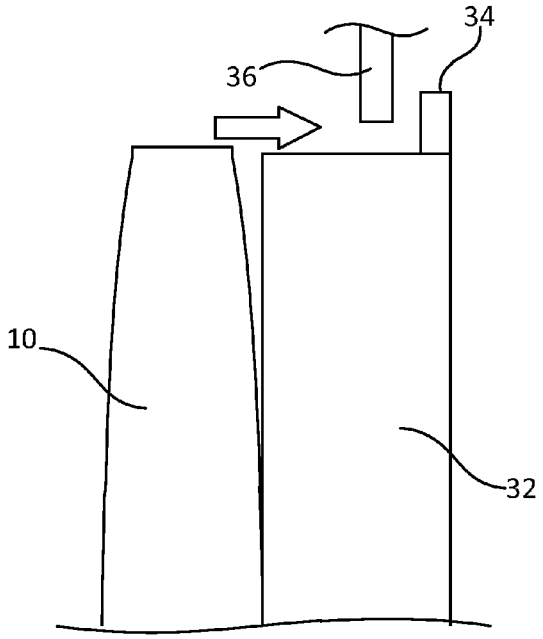
FIG. 8 is an enlarged side view of the battery cell and composite heat spreader of FIG. 7, wherein the composite heat spreader has surpassed threshold temperature and the battery cell is shifted in the thru-plane direction to electrically disconnect the battery cell from the electrical lead.

As discussed above, when heated above the gas evolving threshold temperature, the composite heat spreader will expand in the thru-plane direction. When configured in a battery pack, the expansion will result in the compression of the remaining composite heat spreaders. In this or other embodiments, this expansion of the composite heat spreader can cause the cell to disconnect from the electrical system by physically shifting its location in the stack. For example, with reference to FIG. 7, it an enlarged view of a battery cell 32 and composite heat spreader 10 is shown. As can be seen, the battery cell 32 includes an electrical lead 34 that is electrically connected to a battery pack electrical lead 36. Lead 36 is connected, in turn, to the rest of the electrical system. If a thermal runaway event occurs, it may be advantageous to electrically disconnect the overheated cells from the rest of the electrical system. As can be seen in FIG. 8, in one embodiment, the battery cell 32 is positioned in the battery pack to allow it to move in the thru-plane direction. Thus, when the threshold temperature is reached in the adjacent composite spreader 10 the expanding gas causes the composite spreader 10 to enlarge which in turn forces the electrical lead 34 to disengage electrical lead 36. In this manner, the electrical connection is broken.

As can be seen, the composite heat spreader according to the present invention both promotes the spreading and conduction of heat generated by battery cells during normal operation of a battery pack. The composite heat spreader further functions as a thermal fuse, tending to isolate battery cells that experience thermal runaway from adjacent battery cells. Though the above description focuses on the use of the composite heat spreader in conjunction with a prismatic lithium ion batteries, it should be appreciated that it may be used with other types of batteries, and indeed, in any system that requires thermal spreading and conduction in the inplane direction under normal operating conditions, but thermal isolation in the thru-plane direction when a high heat event occurs.

The various embodiments disclosed herein may be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed:

1. A composite heat spreader comprising:

a first flexible graphite layer;

a second flexible graphite layer;

a gas evolving layer positioned between said first flexible graphite layer and said second flexible graphite layer wherein the composite heat spreader has a predetermined thru-thickness thermal conductivity; and wherein when a threshold temperature is reached, the thermal conductivity of said gas evolving layer is reduced by at least factor of five thereby reducing the predetermined thru-thickness thermal conductivity of the composite heat spreader, said threshold temperature is below about 150 degrees C.

2. The composite heat spreader according to claim 1 wherein said first and said second flexible graphite layer comprises a sheet of a compressed mass of exfoliated natural graphite particles.

3. The composite [beat] *heat* spreader according to claim 1 wherein said first and said second flexible graphite layer comprises a sheet of graphitized polyimide.

4. The composite heat spreader according to claim 1 wherein said first and said second flexible graphite layer have an in-plane thermal conductivity of from between about 250 W/mK and about 700 W/mK.

5. The composite heat spreader according to claim 1 wherein said first and said second flexible graphite layer have an in-plane thermal conductivity greater than at least about 400 W/mK.

6. The composite heat spreader according to claim 1 wherein said gas evolving layer comprises a hydrocarbon polymer.

7. The composite heat spreader according to claim 1 wherein said threshold temperature is at least about 95 degrees C.

8. The composite heat spreader according to claim 1 wherein after said threshold temperature is reached, the average thickness of said gas evolving layer increases by at least about 10 percent.

9. The composite heat spreader according to claim 1 wherein after said threshold temperature is reached, the average thickness of said gas evolving layer increases by at least about 50 percent.

10. The composite heat spreader according to claim 1 further comprising a containment shell.

11. The composite [beat] *heat* spreader according to claim 10 wherein said containment shell encapsulates said first flexible graphite layer, said second flexible graphite layer and said gas evolving layer.

12. A battery pack comprising:

a plurality of battery cells arranged in a stacked configuration, said battery cells each including opposed major surfaces;

at least one composite heat spreader positioned between two adjacent battery cells and contacting a major surface of each said adjacent battery cells;

said composite heat spreader comprising a first flexible graphite layer, a second flexible graphite layer, a gas evolving layer positioned between said first flexible graphite layer and said second flexible graphite layer wherein the composite heat spreader has a predetermined thru-thickness thermal conductivity, and wherein when a threshold temperature is reached, the thermal conductivity of said gas evolving layer is reduced by at least a factor of five thereby reducing the predetermined thru-thickness thermal conductivity of the composite heat spreader, said threshold temperature is below about 150 degrees C.

13. The battery pack according to claim 12 wherein said first and said second flexible graphite layer comprises either a sheet of a compressed mass of exfoliated natural graphite particles or a sheet of graphitized polyimide.

14. The battery pack according to claim 12 wherein said first and said second flexible graphite layer have an in-plane thermal conductivity of at least about 250 W/mK.

15. The battery pack according to claim 12 wherein said gas evolving layer comprises a hydrocarbon polymer.

16. The battery pack according to claim 12 wherein said threshold temperature is at least about 95 degrees C.

17. The battery pack according to claim 12 wherein after said threshold temperature is reached, the average thickness of said gas evolving layer increases by at least about 10 percent.

18. The battery pack according to claim 12 each said battery cell is electrically connected to an electrical system and wherein after said threshold temperature is reached at least one battery is electrically disconnected from said [electrical,] *electrical* system.

19. The battery pack according to claim 12 further comprising a containment shell that encapsulates said first flexible graphite layer, said second flexible graphite layer and said gas evolving layer.

*20. A composite heat spreader comprising:*

*a first flexible graphite layer;*

*a second flexible graphite layer;*

*a gas evolving layer including an expandable graphite, said gas evolving layer positioned between said first flexible graphite layer and said second flexible graphite layer wherein the composite heat spreader has a predetermined thru-thickness thermal conductivity; and*

*wherein when a threshold temperature is reached, the thermal conductivity of said gas evolving layer is reduced by at least factor of five thereby reducing the predetermined thru-thickness thermal conductivity of the composite heat spreader, said threshold temperature is at or above about 150 degrees C.*

*21. The composite heat spreader according to claim 20 wherein said first and said second flexible graphite layer comprises a sheet of a compressed mass of exfoliated natural graphite particles.*

*22. The composite heat spreader according to claim 20 wherein said first and said second flexible graphite layer comprises a sheet of graphitized polyimide.*

*23. The composite heat spreader according to claim 20 wherein after said threshold temperature is reached, the average thickness of said gas evolving layer increases by at least about 10 percent.*

*24. The composite heat spreader according to claim 20 wherein after said threshold temperature is reached, the average thickness of said gas evolving layer increases by at least about 50 percent.*

*25. A battery pack comprising: a plurality of battery cells arranged in a stacked configuration, said battery cells each including opposed major surfaces;*

*at least one composite heat spreader positioned between two adjacent battery cells and contacting a major surface of each said adjacent battery cells;*

*said composite heat spreader comprising a first flexible graphite layer, a second flexible graphite layer, a gas evolving layer including an expandable graphite, said gas evolving layer positioned between said first flexible graphite layer and said second flexible graphite layer wherein the composite heat spreader has a predetermined thru-thickness thermal conductivity, and*

*wherein when a threshold temperature is reached, the thermal conductivity of said gas evolving layer is reduced by at least a factor of five thereby reducing the predetermined thru-thickness thermal conductivity of the composite heat spreader, said threshold temperature is at or above about 150 degrees C.*

*26. The battery pack according to claim 25 wherein said first and said second flexible graphite layer comprises either a sheet of a compressed mass of exfoliated natural graphite particles or a sheet of graphitized polyimide.*

*27. The battery pack according to claim 25 wherein after said threshold temperature is reached, the average thickness of said gas evolving layer increases by at least about 10 percent.*

*28. The battery pack according to claim 25 each said battery cell is electrically connected to an electrical system and wherein after said threshold temperature is reached at least one battery is electrically disconnected from said electrical system.*

* * * * *